(12) United States Patent
Scirbona et al.

(10) Patent No.: US 9,819,161 B2
(45) Date of Patent: Nov. 14, 2017

(54) TUBE SPLITTER

(71) Applicants: Edward Scirbona, Danbury, CT (US); Richard Gerszberg, Larchmont, NY (US)

(72) Inventors: Edward Scirbona, Danbury, CT (US); Richard Gerszberg, Larchmont, NY (US)

(73) Assignee: Jonard Industries Corp., Tuckahoe, NY (US)

( * ) Notice: Subject to any disclaimer, the term of this patent is extended or adjusted under 35 U.S.C. 154(b) by 79 days.

(21) Appl. No.: 15/016,551

(22) Filed: Feb. 5, 2016

(65) Prior Publication Data

US 2016/0268785 A1    Sep. 15, 2016

Related U.S. Application Data

(60) Provisional application No. 62/132,528, filed on Mar. 13, 2015.

(51) Int. Cl.
*H02G 1/12* (2006.01)

(52) U.S. Cl.
CPC .................. *H02G 1/1217* (2013.01)

(58) Field of Classification Search
CPC .................................................... H02G 1/1217
USPC .......................................................... 30/91.1
See application file for complete search history.

(56) References Cited

U.S. PATENT DOCUMENTS

| | | | | |
|---|---|---|---|---|
| 2,120,398 A | * | 6/1938 | Edwards | H02G 1/1229 30/90.6 |
| 2,627,768 A | * | 2/1953 | Cook, Jr. | H02G 1/1217 30/91.1 |
| 2,683,308 A | * | 7/1954 | Cook, Jr. | H02G 1/1217 30/91.1 |
| 3,151,510 A | * | 10/1964 | Bunker | H02G 1/1295 30/90.6 |
| 4,509,257 A | * | 4/1985 | Moriyama | H02G 1/1204 29/825 |
| 4,905,373 A | * | 3/1990 | Krampe | H02G 1/1229 30/90.6 |
| 4,947,549 A | * | 8/1990 | Genovese | G02B 6/245 30/90.8 |
| 4,979,299 A | * | 12/1990 | Bieganski | H02G 1/1224 30/90.1 |
| 5,050,302 A | * | 9/1991 | Mills | G02B 6/245 30/90.4 |
| 5,140,751 A | * | 8/1992 | Faust | G02B 6/4497 30/90.4 |

(Continued)

FOREIGN PATENT DOCUMENTS

DE    20 2013 102 163 U1 *    8/2013
EP         2 621 042 A1 *    7/2013
(Continued)

*Primary Examiner* — Hwei C Payer
(74) *Attorney, Agent, or Firm* — Kamran Emdadi; Emdadi Patent Law

(57) ABSTRACT

A fiber cable may be neatly and efficiently cut if the razor edge is held in a fixed position while the cable is pulled along a cutting channel. One example may have a cable splitting device with a number of channels that include a razor edge in each of the channels and a top portion of the device providing a first half to each of the channels, and a bottom portion providing a second half to each of the channels.

6 Claims, 6 Drawing Sheets

(56) References Cited

U.S. PATENT DOCUMENTS

| 6,138,362 | A | * | 10/2000 | Yoshimori | H02G 1/1224 30/90.1 |
|---|---|---|---|---|---|
| 2010/0307007 | A1 | * | 12/2010 | Grosserichter | H02G 1/1224 30/90.6 |
| 2016/0268785 | A1 | * | 9/2016 | Scirbona | H02G 1/1217 |

FOREIGN PATENT DOCUMENTS

| GB | 895 442 | * | 5/1962 |
|---|---|---|---|
| GB | 2 238 670 B | * | 2/1994 |

* cited by examiner

TUBE SPLITTER

CROSS-REFERENCE TO RELATED APPLICATION

This application claims priority to earlier filed provisional patent application No. 62/132,528 entitled "TUBE SPLITTER", filed on Mar. 13, 2015, the entire contents of which are hereby incorporated by reference.

TECHNICAL FIELD OF THE APPLICATION

This application relates to a stripping tool and more particularly to a multi-size cylindrical channel tube splitter with precision cutting edges for neat splitting of fiber cables.

BACKGROUND OF THE APPLICATION

Conventionally, stripping tools used for stripping tubes holding fiber communications media have been developed to provide a small incision or a cutaway portion of a cable without damaging the signal carrying medium inside such tubes. The level of precision and accuracy of the cutting may be optimized to avoid failed attempts to make an incision without destroying the communication carrying medium inside the tub.

SUMMARY OF THE APPLICATION

Embodiments of the present application may include an apparatus that includes at least one of a plurality of channels comprising at least one razor edge in each of the plurality of channels, a top portion providing a first half of the plurality of channels, and a bottom portion providing a second half of the plurality of channels.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of an apparatus, and system configuration, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

The tube/cable slitting apparatus provides a plurality of groove channels designed to provide easy access to optical fibers contained in loose buffer tubes sized between 1.2 mm-3.3 mm in diameter. With six precision grooves, buffer tube slitting can be performed without damage to the fiber. The blades are replaceable by the blade inserts as stand-alone inserts in the cable slicing apparatus.

Figure 1:
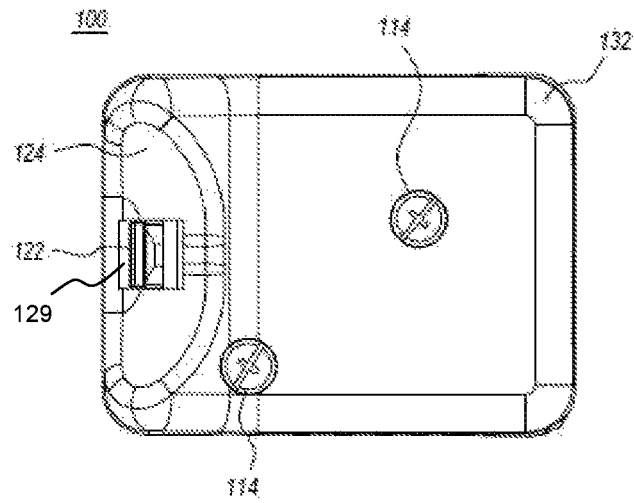
FIG. 1 illustrates an example top perspective hollow view of the structure of the cable splitter according to example embodiments.

FIG. 1 illustrates an example hollow top view of the structure of the cable splitter 100 according to example embodiments. Referring to FIG. 1, the body of the top portion 132 of the apparatus is illustrated as the exterior of the cable splitter which includes a set of screws 114 a depressed and curved finger accessible portion 124, and a lock tab 122 and slot configuration that passes through a cavity to lock the tab lip on a resting lip 129. The screws 114, are used to affix the razor channel inserts (see FIG. 3) into position inside the clam-shell like configuration of the cable splitter apparatus.

Figure 2:
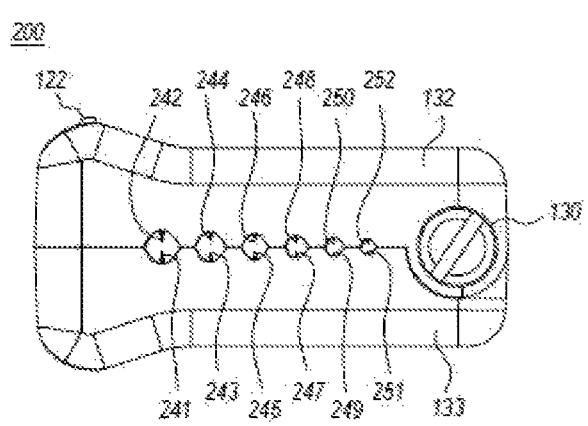
FIG. 2 illustrates example side view of the structure of the cable splitter according to example embodiments.

FIG. 2 illustrates example side view of the structure of the cable splitter 200 according to example embodiments. The side view illustrates the binding bolt 130 and screw configuration which holds the top 132 and bottom 133 portions of the clam-shell splitting configuration. The closed-position illustrates six channels with semi-cylindrical holes 141, 143, 145, 147, 149 and 151 each of which have different sized diameters including 2.9-3.3mm, 2.5-2.9mm, 2.1-2.5mm, 1.8-2.1mm, 1.5-1.8mm, and 1.2-1.5mm, respectively. Also, the cylindrical channels are formed with two separate razor edge pairs inside the channel including 241-251 on the bottom half and 242-252 on the top half. The first razor edge of each pair is provided from a first side of the clam-shell configuration and the second razor edge of the pair is provided from a second side of the clam-shell configuration. The razors from each half portion are aligned directly over one another as shown in FIG. 2.

Figure 3:
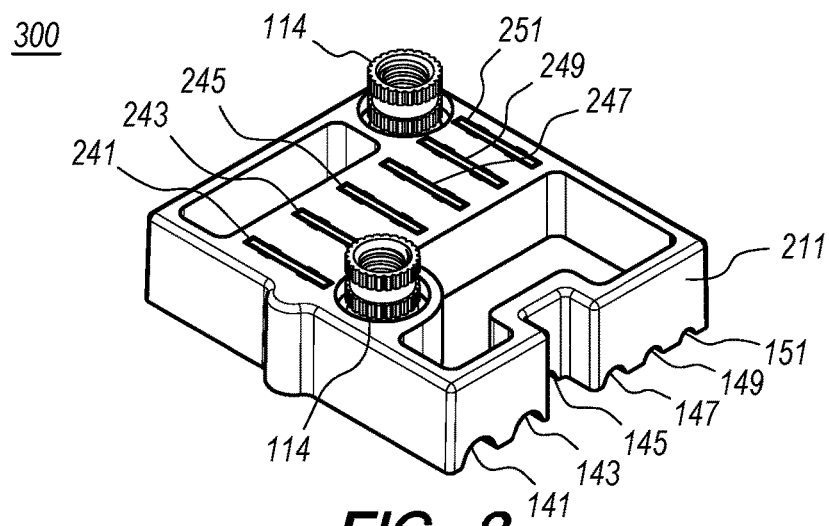
FIG. 3 illustrates an example rear view of one of the razor insert portions of the cable splitter according to example embodiments.

FIG. 3 illustrates an example rear view of one of the razor insert portions of the cable splitter according to example embodiments. Referring to FIG. 3, the insert illustration 300 includes the insert 211 face-down with two threaded insert channels which receive the bolts 114 which pass through the outer shell portion of the cable slicer and which are turned into the channel to affix the insert 211 to the clam-shell configuration. The bottom portions of the razors 241, 243, 245, 247, 249 and 251 are exposed as flat metal surfaces which are affixed to slots which receive the razors during manufacturing. The razors are exposed on the channel side of each channel, respectively, 141, 143, 145, 147, 149 and 151. The largest channel 141 has the largest razor 241, and the next largest channel 143 has the next largest razor 243, and so on, until the smallest channel 151 has the smallest razor 251. The relative sizes of the razor heights can be viewed from the example in FIG. 2. The razor channel 145 is slightly shorter than the other channels due to the cavity formed near the center of the razor insert 211.

Figure 4:
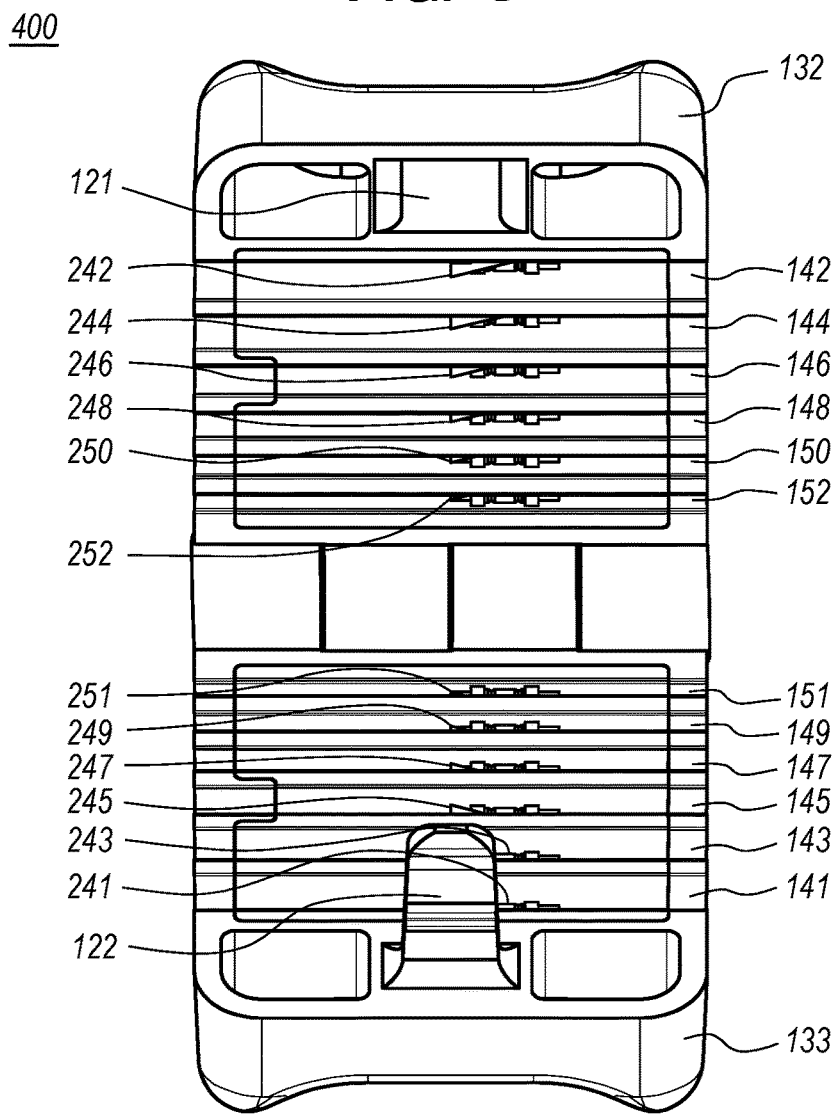
FIG. 4 illustrates a front view of the cable splitter in an open position with both razor inserts affixed to the cable splitter according to example embodiments.

FIG. 4 illustrates a front view of the cable splitter in an open position with both razor inserts affixed to the cable splitter according to example embodiments. Referring to FIG. 4, the open-faced clam-shell like configuration 400 includes both razor inserts 211 and 213 affixed to the body of the slicer to form a top and bottom portion of the slicer apparatus. The razors are each set on a right-side or right-half portion of the various channels including both the top channels 142, 144, 146, 148, 150 and 152 and the corresponding bottom channels 141, 143, 145, 147, 149 and 151. In a closed position, the razors on the top half 242, 244, 246, 248, 250 and 252 will be aligned directly over the bottom half razors 241, 243, 245, 247, 249 and 251, inside the cylindrical channels. Also, the tips of the razors are aligned to directly adjacent and over one another to create a maximum cutting distance that can be used to cut into the cables inserted into the channels during a use operation. Also, the tab 122 may pass directly through the hole 121 when the top portion 132 is pressed against the bottom portion 133 in a closed position.

Figure 5A:
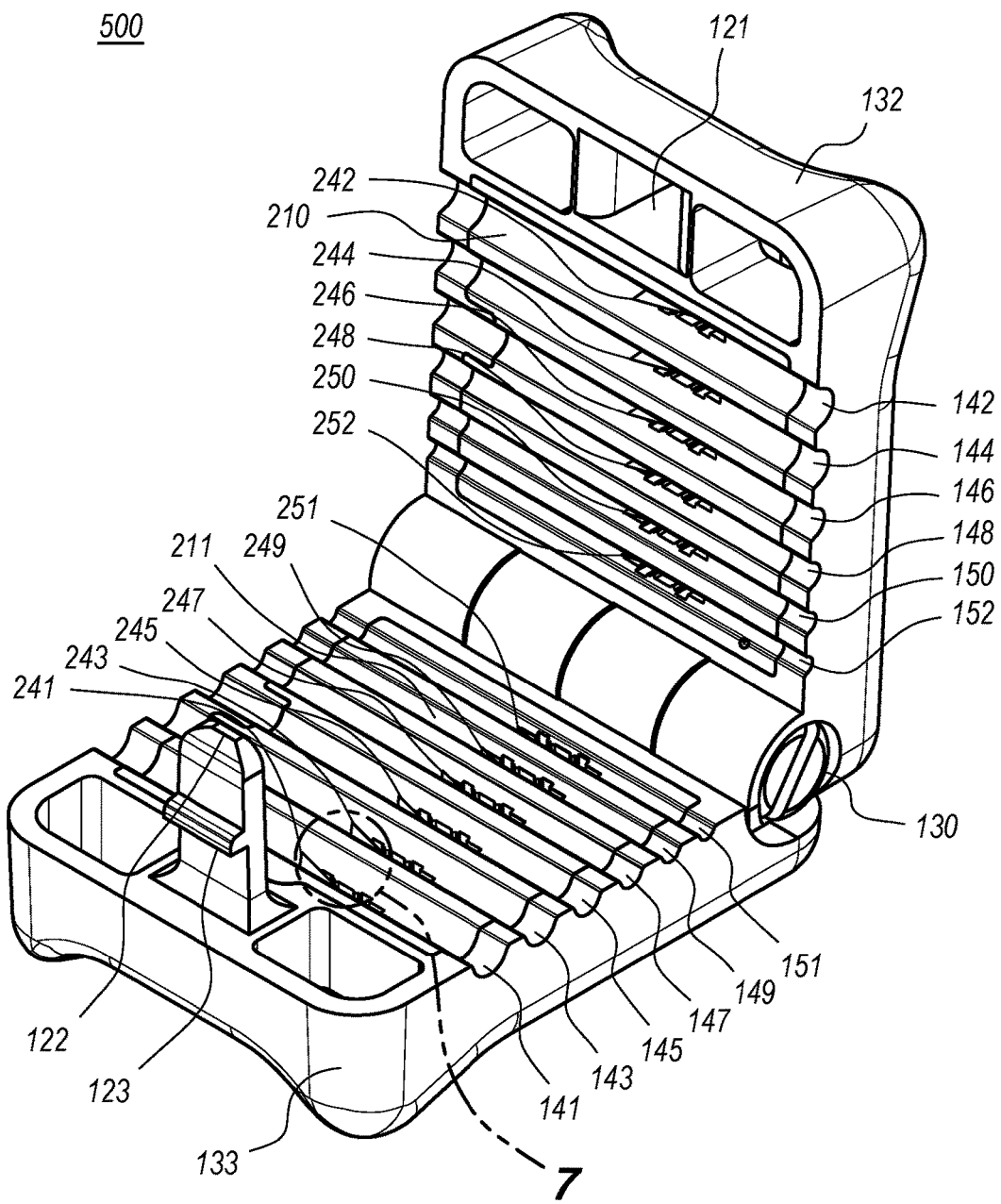
FIG. 5A illustrates a sideways perspective of the cable splitter in an open position with both razor inserts affixed to the cable splitter according to example embodiments.

FIG. 5A illustrates a sideways perspective of the cable splitter 500 in an open position with both inserts affixed to the cable splitter according to example embodiments. For all drawings, like reference numerals refer to like elements throughout. Referring to FIG. 5A, the two razor inserts 211 and 210 are illustrated as being affixed to the inner layer of the slicer apparatus. As may be observed, the razors are in the same position on each channel and are all disposed on one half of the channel length while the other half is empty and has no razors. The peaks of the razor edges are closer to the center of each channel for each individual channel. The closing tab 122 has a lip 123 for securing to a lip resting surface inside the passage 121 of the top portion of the device configuration.

Figure 5B:
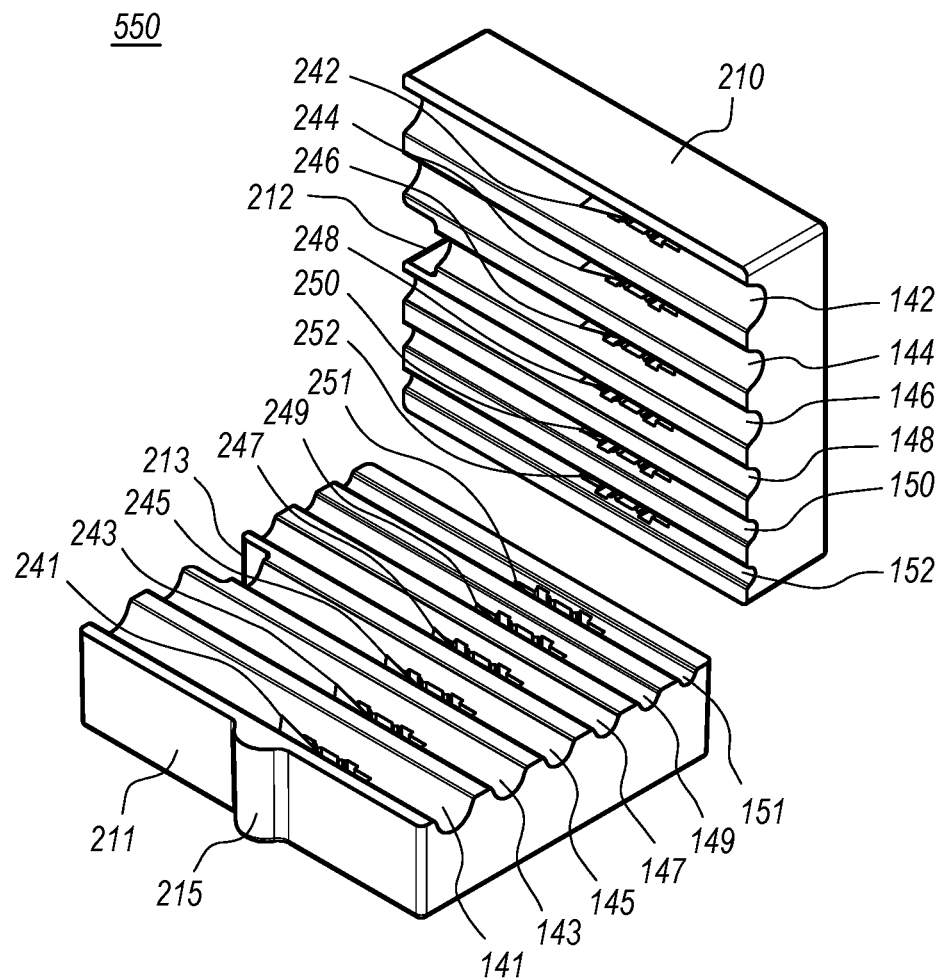
FIG. 5B illustrates a sideways perspective of the razor inserts according to example embodiments.

FIG. 5B illustrates a sideways perspective of the inserts alone 550 according to example embodiments. Referring to FIG. 5B, the two inserts 210 and 211 each have a curved depression 212 and 213 for form-fitting inside a body of the cable splitter device. The bottom portion may also have a curved protrusion 215 while the top portion may be flat on its topmost edge.

Figure 6:
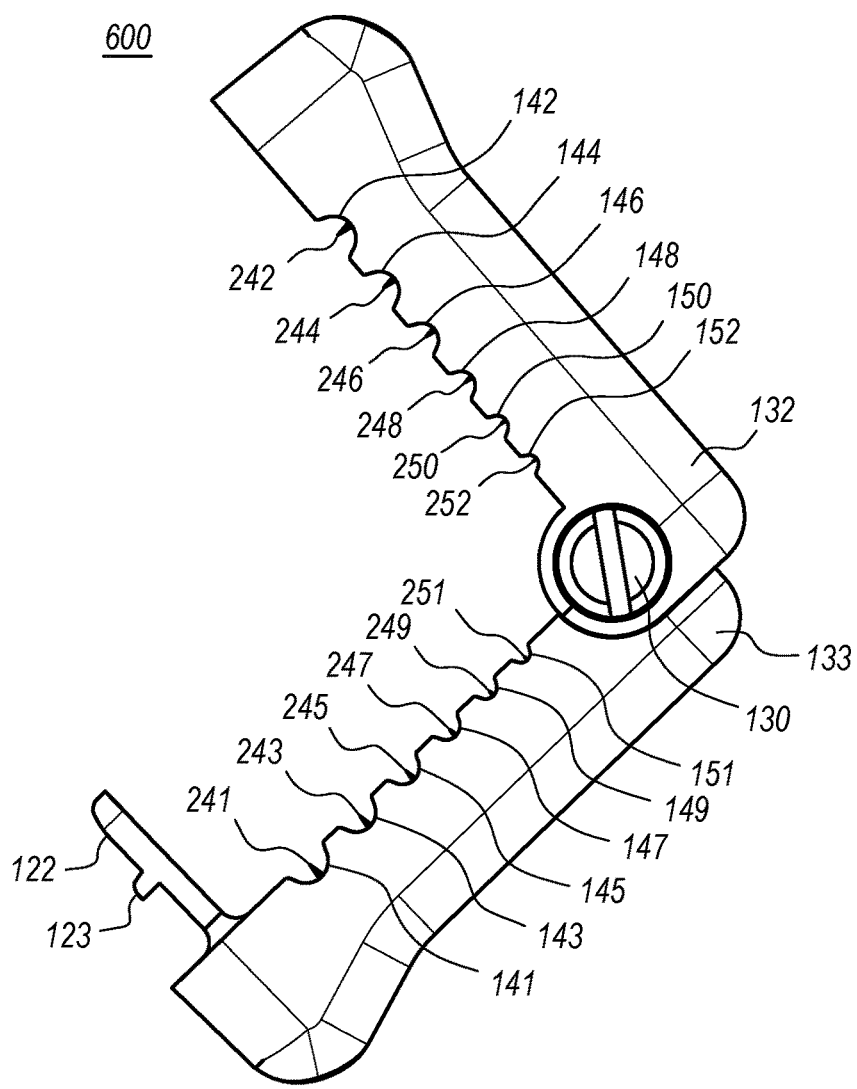
FIG. 6 illustrates a sideways perspective of the cable splitter in an open position with both razor inserts affixed to the cable splitter according to example embodiments.

FIG. 6 illustrates a sideways perspective of the cable splitter in an open position with both inserts affixed to the cable splitter according to example embodiments. Referring to FIG. 6, the illustration 600 includes all six channels formed by the grooves on both sides of the clam-shell halves 132 and 133. In alternative embodiments, the razors may only appear on one channel half and not the other, and the number of channels may be 2, 4, 5, 6, 7, 8, 10 or more.

Figure 7:
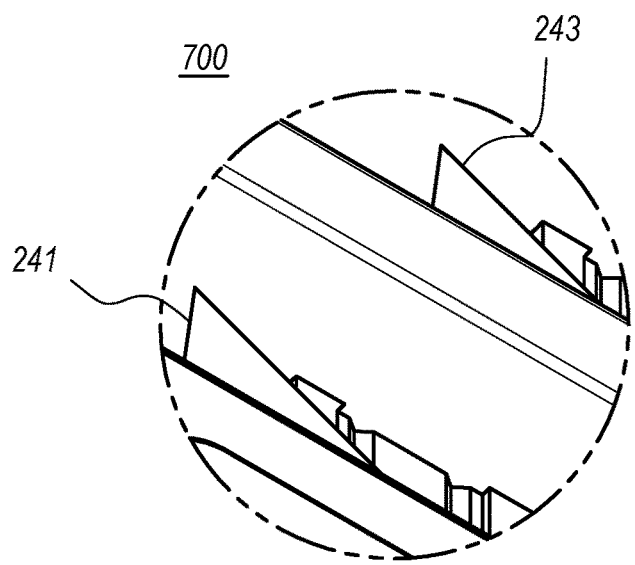
FIG. 7 illustrates a scaled view of some of the blades of the razor insert of the cable splitter according to example embodiments.

FIG. 7 illustrates a scaled view of two of the blades of the insert 211 of the cable splitter according to example embodiments. Referring to the example in FIG. 7, a razor edge 141 has a peak portion and a declining sloped-edge. The razor is embedded in the body of the channel via a hole carved into the channel. Razor 241 is larger than the next channel razor 243 as shown in the blown-up perspective of the razors. The embodiments described may be plastic, metal, or a poly-carbon/poly-plastic material.

In operation, the user may select the correct groove size. Each groove is marked with the recommended fiber size. The fiber can then be placed in the groove to be used. The arrow on the top of the body indicates a blade location and a pulling direction to split the cable. Next, the device may be closed in a closing clam-shell configuration and locked to permit a user to pull the cable to the desired slit length.

Figure 8:
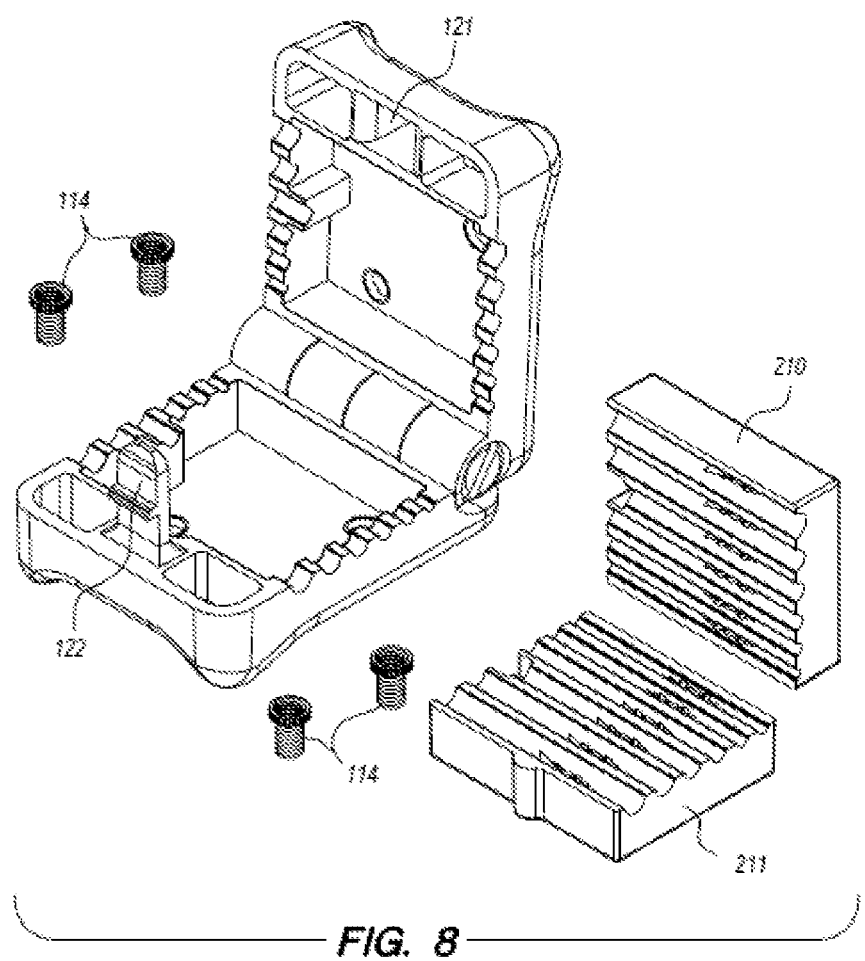
FIG. 8 illustrates an exploded view of the cable splitter according to example embodiments.

FIG. 8 illustrates an exploded view of the cable splitter according to example embodiments. Referring to FIG. 8, the top and bottom halves of the open configuration of the cable splitter illustrate two holes in the exterior surfaces and two screw pairs 114 which enter those holes to secure the top and bottom portions of razor insert tracks 211 and 210.

One example embodiment may include the tube splitter device having a top portion 132 providing a first half of a plurality of channels 142-152 and a bottom portion providing a second half of the plurality of channels 141-151. The top portion and the bottom portion are connected via a rotating axis 130 and are configured to rotate and lock into a closed position to form a plurality of channels each of which has at least one razor blade edge 241-251 and/or 242-252. The top portion includes a first removable razor insert track 210 which provides a majority length of the first half of the plurality of channels and at least one razor edge in each of the plurality of channels. As may be observed, the channels extend before and after the insert is in-place, however, the majority of the length of the channels is provided by the insert 210. Also, the bottom portion includes a second removable razor insert track 211 which also provides a majority length of the second half of the plurality of channels and at least one razor edge in each of the plurality of channels.

The top portion further includes a hole 121 with a resting lip edge and the bottom portion further includes a tab 122 with a lip 123 extending upward or perpendicular to a planar surface of the bottom portion 133, and when the top portion and the bottom portion are in a closed position the tab extends beyond a planar surface of the top portion and maintains a locked position via the lip resting against the resting lip edge as shown in FIG. 2. The top portion further includes at least one hole permitting at least one screw to pass through the hole and secure the first removable razor insert track to the top portion as illustrated in FIG. 8. In that example, there are actually two holes in each of the top and bottom portions, however, one, two or more holes may be used in alternative embodiments. The bottom portion further includes at least one hole permitting at least one screw to pass through the hole and secure the second removable razor insert track to the bottom portion. In a closed position the top portion includes at least one razor edge disposed in each of the plurality of channels positioned directly opposite at least one additional razor edge disposed in each of the plurality of channels extending from the bottom portion (See FIG. 5A). In alternative examples, the plurality of channels includes 2, 4, 6, 8, 10 or 12, 6 was merely an example number of channels. The plurality of channels are cylindrical-shaped channels.

In a closed position, the bottom half and the top half form a cylindrical channel with protruding razor edges on the top and the bottom of each of the plurality of channels, and the razor edges are directly opposite one another and disposed on one half side of the plurality of cylindrical channels (the right side of the channel).

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

What is claimed is:

1. An apparatus comprising:
    a top portion providing a first half of a plurality of cylindrical channels, the top portion comprising a first removable razor insert track comprising a majority length of the first half of the plurality of cylindrical channels, and wherein the first removable razor insert track rests flush mounted to a portion of a length of the first half of the plurality of cylindrical channels not provided by the first removable razor insert track; and
    a bottom portion providing a second half of the plurality of cylindrical channels, the bottom portion comprising a second removable razor insert track comprising a majority length of the second half of the plurality of cylindrical channels, and wherein the second removable razor insert track rests flush mounted to a portion of a length of the second half of the plurality of cylindrical channels not provided by the second removable razor insert track, and
    wherein the top portion and the bottom portion are connected via a rotating axis and are configured to rotate and lock into a closed position, via a tab disposed on the bottom portion and which protrudes through a hole in the top portion, and wherein in the closed position the top portion and the bottom portion form a plurality of complete cylindrical channels each of which comprises at least one razor blade edge, and wherein the razor blade edges of the plurality of complete cylindrical channels all have different sizes.

2. The apparatus of claim 1, wherein the hole in the top portion comprises a resting lip edge and the tab comprises a lip, and wherein the tab extends perpendicular to a planar surface of the bottom portion, and wherein when the top portion and the bottom portion are in the closed position when the tab extends beyond a planar surface of the top portion and maintains a locked position via the lip resting against the resting lip edge.

3. The apparatus of claim 1, wherein the top portion further comprises at least one hole permitting at least one screw to pass through the at least one hole and secure the first removable razor insert track to the top portion.

4. The apparatus of claim 1, wherein the bottom portion further comprises at least one hole permitting at least one screw to pass through the at least one hole and secure the second removable razor insert track to the bottom portion.

5. The apparatus of claim 1, wherein in the closed position the top portion comprises the at least one razor edge disposed in each of the plurality of channels positioned directly opposite at least one razor edge disposed in each of the plurality of channels extending from the bottom portion.

6. The apparatus of claim 1, wherein the plurality of complete cylindrical channels comprises 2, 4, 6, 8, 10 or 12.

* * * * *